Aug. 16, 1966    J. R. McGUIRE ETAL    3,266,520
HYDRAULIC VALVES
Filed July 15, 1964    3 Sheets-Sheet 1
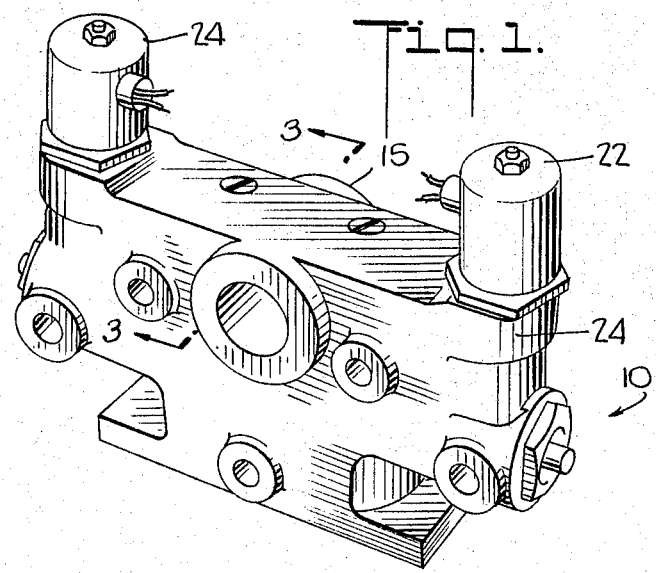
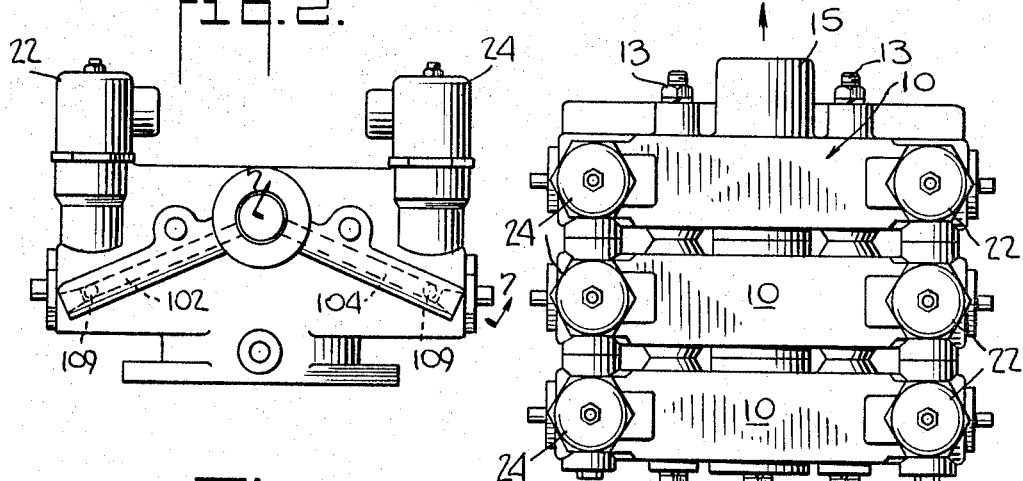
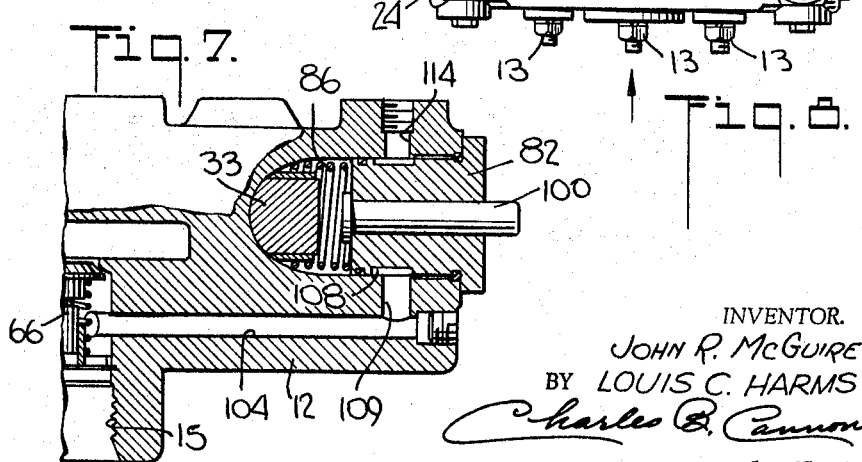
INVENTOR.
JOHN R. McGUIRE
BY LOUIS C. HARMS
Charles B. Cannon
ATTORNEYS

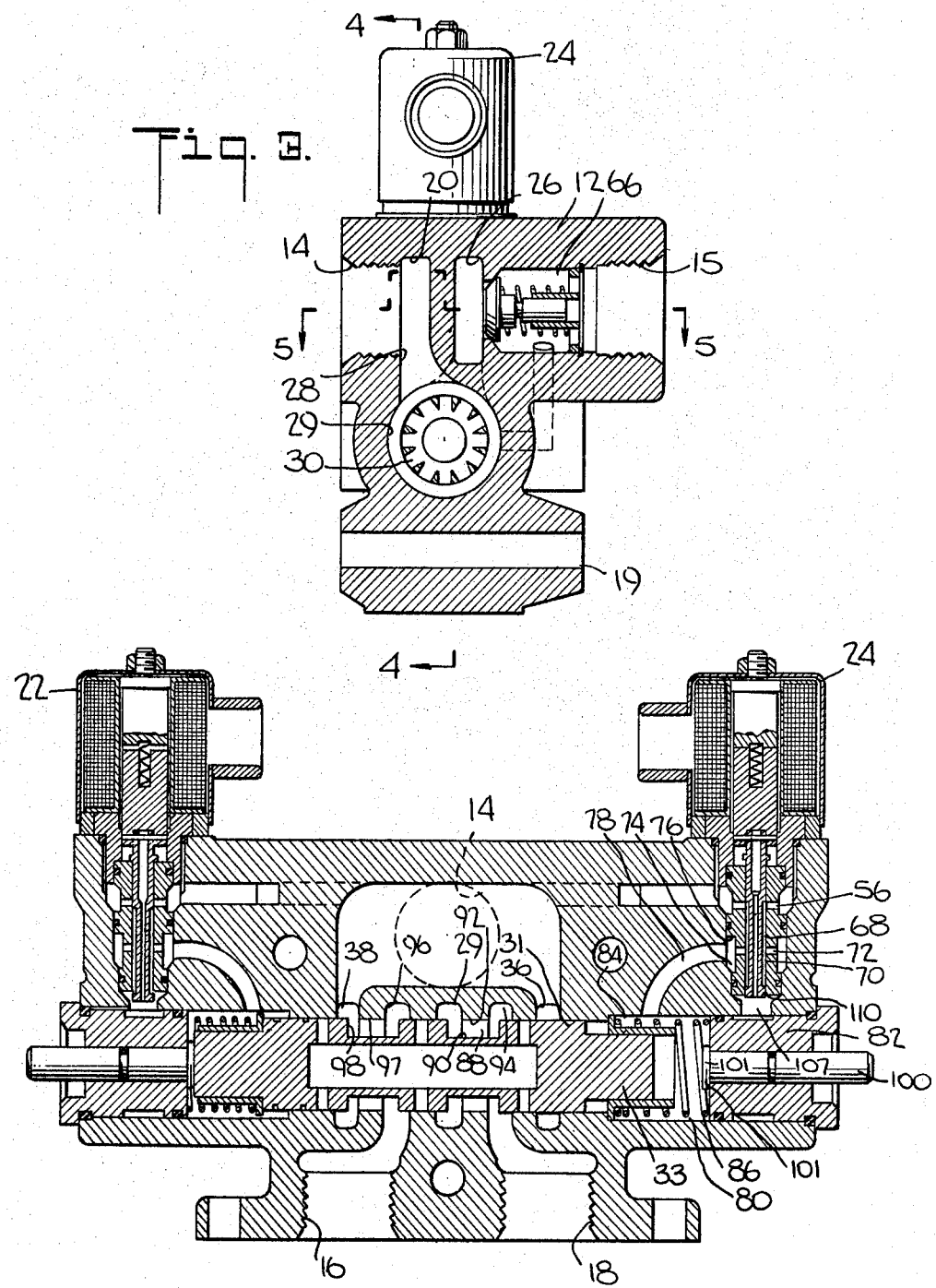

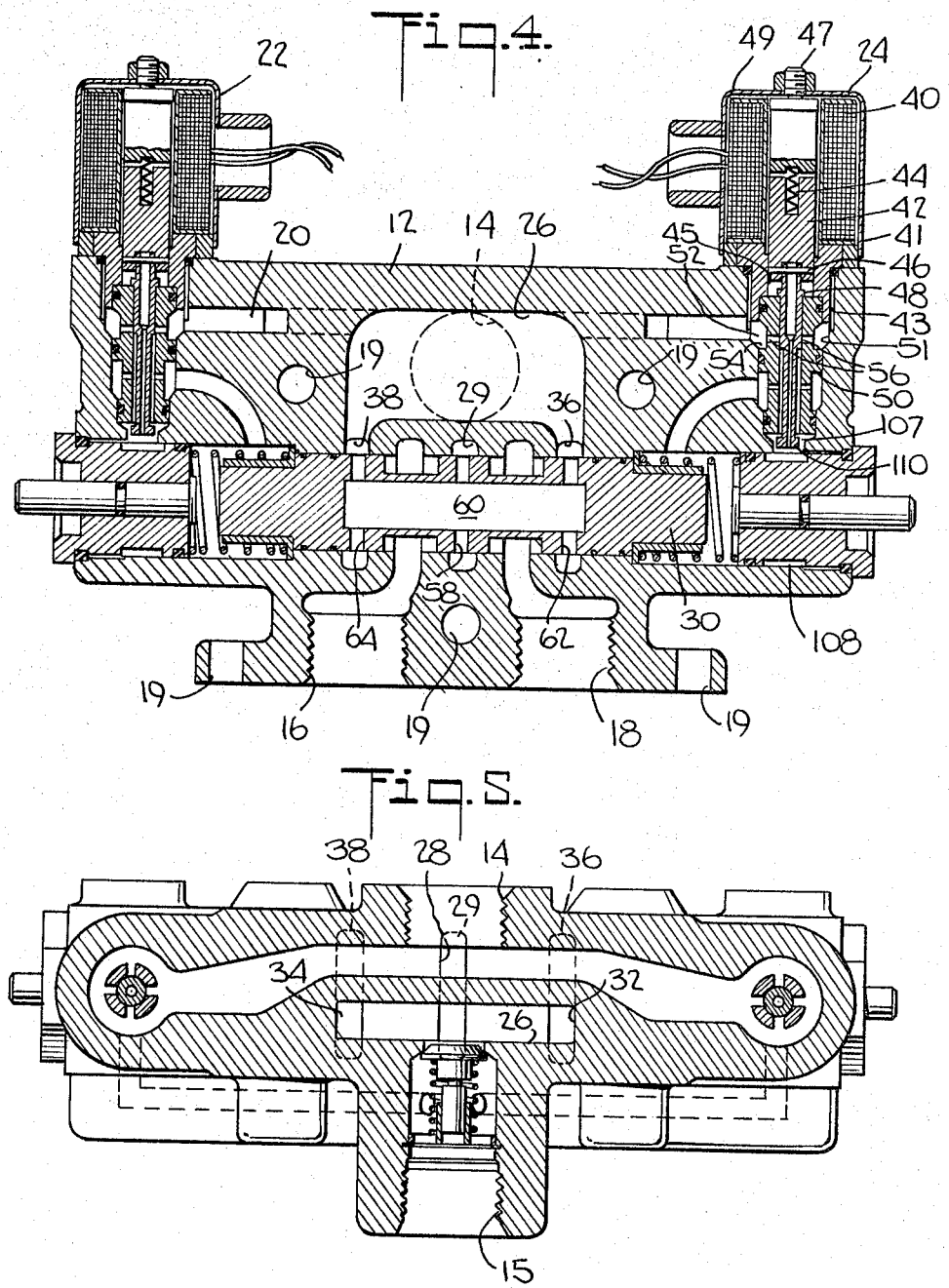

United States Patent Office 3,266,520
Patented August 16, 1966

3,266,520
HYDRAULIC VALVES
John R. McGuire, Northfield, and Louis C. Harms, Evanston, Ill., assignors to Fluid Power Accessories, Inc., Glenview, Ill., a corporation of Illinois
Filed July 15, 1964, Ser. No. 382,967
6 Claims. (Cl. 137—596.13)

The present invention relates to hydraulic valves and more particularly to a new and improved cartridge-type solenoid-actuated, pilot-operated multi-position valve.

The valves of the present invention find their principal utility in mobile, hydraulically-controlled equipment; such as, road graders and the like. In such equipment heretofore, hydraulic control valves have been individually custom-installed. Likewise, there was required substantial external hydraulic piping for such valves which had to be disconnected each time the valve was serviced or replaced.

The valves of the present invention are characterized by the provision of a new and improved cartridge-type, solenoid-actuated multi-position pilot-operated hydraulic control valve which can be used individually or banked together with similar valves for controlling directly or through layer associated valves, from a remote position, such as, the control cab of a road grader, the hydraulic members of such hydraulically-operated equipment.

Each valve is controlled and operated by a pair of solenoid-actuated pilot valves which control the position of the valve's main spool, thus controlling the direction of hydraulic flow through the various ports in the valve. The valve of the present invention is simple, compact, easily removed for service and can be employed to control substantially larger valves.

To help suppress hydraulic shock as the valve is actuated or de-actuated and ensure pressure at the pilot valves for positive operation of the valve, there is employed with each bank of valves (or with the one valve if used singly) a back pressure check valve in the outlet port of such valve to control and ensure positive valve spool movement. Likewise, there is provided, for emergency use; such as, a solenoid or pilot valve malfunction, a manual operator for the main valve spool member.

Therefore it is the object of the present invention to provide a new and improved cartridge-style, solenoid-actuated, pilot-controlled multi-position hydraulic valve.

Another object of the invention is to provide a cartridge-style, pilot-actuated hydraulic control valve which can be used singly or banked with other similar valves for remotely controlling a plurality of hydraulically-controlled elements.

An added object of the invention is to provide, in a new and improved hydraulic valve, a pair of solenoid-actuated pilot valves for controlling the position of the main valve spool thereby controlling the flow of hydraulic fluid therethrough.

A further object of the present invention is to provide a new and improved cartridge-type, solenoid-actuated, pilot-controlled hydraulic valve that is simple, compact, relatively inexpensive, and readily serviceable yet is highly effective and capable of controlling substantially larger valves.

It is also an object of the present invention to provide, in a new and improved hydraulic valve, a pair of solenoid-actuated pilot valves each of unitary construction for ready insertion and removal as a unit into and out of operative position in said valve, thereby facilitating maintenance and repair of said valve.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

In the drawings:
FIG. 1 is a perspective view of a valve embodying the present invention;
FIG. 2 is an end view of the valve illustrated in FIG. 1;
FIG. 3 is a sectional side elevation taken along line 3—3 FIG. 1;
FIG. 4 is a sectional view taken along line 4—4 FIG. 3;
FIG. 5 is a sectional plan view taken along line 5—5 FIG. 3;
FIG. 6 is a sectional view similar to FIG. 4 illustrating the valve with a portion thereof in actuated condition;
FIG. 7 is a partial sectional plan view illustrating the back pressure check valve;
FIG. 8 is a plan view illustrating a plurality of banked valves of the present invention.

Referring to the drawings and specifically to FIGS. 1–5, there is illustrated therein the preferred embodiment of the valve of the present invention, designated generally 10, which includes a body portion 12 having an hydraulic inlet 14, a tank port 15 and a pair of cylinder ports 16 and 18 formed therein as shown best in FIGS. 3–5.

To mount valve 10, singly or banked as shown in FIG. 8, in position with ports 16 and 18 thereof properly positioned relative to their associated cylinders, body portion 12 is provided with a plurality of spaced mounting holes 19 therethrough to accommodate suitable mounting means therein, such as, bolts 13.

Body 12 of valve 10 is likewise provided with a plurality of fluid channels therein, including a first channel 20 interconnecting hydraulic inlet 14 with both pilot valves 22 and 24; a second channel or chamber 26 communicating with tank port 15, a third channel 28 connecting inlet 14 with a first annular opening 29 in body 12 through which the main valve spool 30 which is slidably mounted in recess 31 in body 12 passes and a pair of channels 32 and 34 connecting chamber 26 with annular openings 36 and 38 respectively in body 12 through which spool 30 also passes.

Each pilot valve 22 and 24 is constructed and operates substantially identically with valve 22 controlling passage of hydraulic fluid into cylinder port 16 and valve 24 controlling passage of fluid into cylinder port 18 as described hereinbelow. In the interests of brevity therefore, only one valve 24 will be described in detail with like reference numerals being applied to both valves 22 and 24 for like parts.

Valve 24 includes an electrically-energized solenoid 40 seated on a mounting 41 positioned in an accommodating recess 43 in body 12 (see FIG. 4). Solenoid 40 has a vertically-disposed, normally-extended plunger 42 disposed within opening 45 in mounting 41 and biased into recess 43 in position shown in FIG. 4 by an internal spring 44. The free end of plunger 42, in turn, is secured as by pin 46 to the uppermost end of pilot valve spool 48 which is slidable in a valve cage 50 seated in the lower portion of body recess 43.

As will be noted solenoid 40 and pilot valve spool 48 are interconnected. Thus, to remove solenoid 40 and pilot valve spool 48 from operative position shown in FIG. 4, lock nut 45 is loosened from threaded stud 47 on cover 49. Cover 49 is then removed, exposing solenoid 40 which is simply lifted from seated position on mounting 41 thereby withdrawing spool 48 from position in cage 50. This also provides access to cage 50 and the other elements in recess 43 for any maintenance or repair. To reassemble pilot valve 24, the foregoing process is simply reversed. The provision of a unitized construction of the operating parts of valve 24 sometimes referred to as "cartridge-type" construction, greatly simplifies any maintenance and repair, particularly any such repair which must be done in the field where only the usual hard tools may be available.

In operation when hydraulic fluid enters inlet 14 it enters channel 20 and flows toward each pilot valve 22 and 24. The fluid, as it approaches the respective pilot valves 20 and 24, enters an annular passage 52 formed by an annular shoulder 54 on cage 50 and the wall 51 of recess 43 and thence from passage 52 into a plurality of spaced radial bores 56 formed in cage 50 which communicate with passage 52. When the associated solenoid 40 of pilot valves 22 and 24 is de-energized as is shown in FIG. 4, the further passage of fluid entering the bores 56 is blocked by pilot valve spool 48.

However, hydraulic fluid entering through inlet 14 also enters channel 28 and thence to annular opening 29. Since neither pilot valve 22 or 24 is energized, main valve spool 30 is in the position shown in FIG. 4. In this position, the radial bores 58 formed in spool 30 communicate with annular opening 29 to admit the hydraulic fluid into an elongated, cylindrical internal chamber 60 formed in spool 30. The fluid thus entering chamber 60 moves therethrough and exits therefrom through additional radial bores 62 and 64 in spool 30 into annular openings 36 and 38 respectively aligned therewith when spool 30 is in the position shown in FIG. 4. From openings 36 and 38, the hydraulic fluid enters associated channels 32 and 34 respectively and thence flows into chamber 26. From chamber 26, the hydraulic fluid flows past check valve 66 through tank port 15 and out of valve 10.

However, when the solenoid 40 of one of the pilot valves; such as, valve 24 for example is energized as shown in FIG. 6, plunger 42 thereof is retracted, compressing spring 44 and raising pilot valve spool 48 to position shown in FIG. 6. With spool 48 in this position, fluid entering radial bores 56 passes into an elongated tubular passage 68 formed between cage 50 and spool 48 by means of an annular indented section 70 on spool 48.

In turn, fluid in passage 68 exits therefrom through a second set of radial bores 72 in cage 50 into a second annular passage 74 formed by a second annular shoulder 76 on cage 50 and wall 51 of recess 43. Passage 74 in turn communicates with an arcuate channel 78 formed in body 12 which connects passage 74 with an internal chamber 80 in body 12. Chamber 80 is closed at one end by a cap 82 and communicates with recess 31 at its other end with one end 33 of spool 12 normally seated in an annular stop member 84 located in chamber 80. Spring 86 is also provided in chamber 80 between stop 84 and cap 82 for reasons hereinbelow set forth.

Hydraulic fluid, moving through passage 74 of one of the actuated pilot valves then passes through channel 78 into chamber 80. The fluid, travelling under pressure bears against the end 33 of main valve spool 30 within chamber 80 sliding spool 30 in recess 31 against the action of spring 86 in chamber 80 associated with the non-energized pilot valve. This movement of the main spool 30 moves the radial main spool bores 58, 62 and 64 out of alignment with their respective annular passages 29, 36 and 38, interrupting the flow of fluid therethrough toward tank port 15.

However, when, for example, valve 24 is energized moving spool 30 into the position shown in FIG. 6, hydraulic fluid in annular passage 29 moves into an annular passage 88 transverse thereto and formed by an annular peripheral recess 90 on spool 30 and the inner surface 92 of recess 31. Fuid in passage 88 then flows into an annular passage 94 in body 12 in communication with cylinder port 18. The return flow of hydraulic fluid from the associated hydraulic element enters cylinder port 16, passing into an associated annular passage 96 in body 12, through a second annular passage 97 formed by a second annular peripheral recess 98 on spool 30 and recess 31 in body 12 and hence into annular passage 38, channel 34 and chamber 26, past check valve 66 through tank port 15, and out of valve 10.

It will be understood that when pilot valve 22 is actuated, spool 30 is moved in recess 31 in the opposite direction from that shown in FIG. 6 and described heretofore, causing flow of fluid from annular passage 29 through passage 97 into passage 96 and thence through cylinder port 16, returning via cylinder port 18, passages 94, 88 and 36 to chamber 26 and thence exiting valve 10 through tank port 15.

In the event of electrical or hydraulic malfunction, each cap 82 is provided with a manually-slidable push rod 100 mounted therein, the free end 101 of which is adapted to bear against its associated end 33 of spool 30 to move spool 30 in the direction desired to obtain the desired valve operation.

Check valve 66 is provided in each valve of the present invention when used singly or in the last valve of a bank of valves. Check valve 66 is employed to maintain some back pressure in the valves 10 thereby maintaining pressure at each of the pilot valves and thus assuring positive operation of main valve spool 30.

To accomplish this, the valve 10 having a check valve 66 seated in its tank port 15 is provided with a pair of back pressure fluid channels 102, 104 communicating tank port 15, through inlet bores 109 in body 12 with annular passages 106, 108 in the end cap 82 associated with pilot valves 22 and 24 respectively.

When valves 22 and 24 are de-energized as shown in FIG. 4, passages 106 and 108 communicate with the lowermost part 107 of recess 31. Back pressure fluid can thus enter recess 31 of the respective valves 22 and 24. With valves 22, 24 de-energized, their associated pilot spools 48 are in their lowermost position in their cage 50. This permits back pressure fluid in recess 31 to pass through passage 70 and bores 72 into channel 78 and hence into chamber 80.

When valve 22 or 24 is energized, spool 78 is raised, the bottom flange 110 wedges against sides of tubular passage 68 adjacent the bottom portion 112 thereof interrupting communication with annular passage 106 or 108 and passage 68 (see FIG. 6). However, the back pressure fluid already in passage 78 and chamber 80 assists the fluid entering therein when its associated valve 22 or 24 is actuated to slide main spool 30 in recess 31.

It will also be understood that the back pressure fluid in the chamber 80 of the un-energized pilot valve tends to cushion the movement of spool 30 along with spring 86 therein, thereby providing smooth main spool motion.

When the valves 10 are banked together as shown in FIG. 8, the back pressure drain holes 114 (only one of which is shown) in valve body 12 of the last valve 12 is connected to the inlet bores 109 of the next proceding valve 10 in the bank. Thus, only one check valve 66 need be employed with the bank of valves 10.

Thus, there is disclosed a new and improved cartridge-style, solenoid-actuated, pilot-operated multi-position hydraulic valve. It will thus be seen from the foregoing description considered in conjunction with the accompanying drawings that the present invention provides such new and improved hydraulic valve, having the desirable advantages and characteristics and also accomplishing its intended objects including those hereinbefore pointed out and others which are inherent in the invention.

What is claimed is:

1. An hydraulic valve provided with a valve body having an inlet port, means for establishing a back pressure in said inlet port, a tank port and a pair of cylinder ports, a valve control member movably mounted in said valve body for selectively admitting hydraulic fluid into one of said cylinder ports from said inlet port and from the other of said cylinder ports to said tank port, channel means in said valve body communicating said inlet port with said control member and said tank port and communicating said control member and said cylinder ports, said control member normally interconnecting said inlet port with said tank port for passage of fluid directly therebetween, and fluid-operated actuating means for moving said control member in said valve body in a selected direction to admit hydraulic fluid from said inlet port into a particular cylinder port, said fluid-operated actuating means including a solenoid-controlled pilot valve associated with each cylinder port, means mounting said pilot valve with the valve spool thereof disposed in an associated recess in said valve body, means communicating said recess with said channel means from said inlet port, means normally positioning said pilot valve spool to interrupt the flow of hydraulic fluid from said inlet port through said recess, a chamber formed in said valve body adjacent each end of said control member, means communicating one of said chambers with one of said recesses in said body, and means connecting said pilot valve spool and said solenoid whereby upon selected energization of said solenoid, the pilot valve spool associated therewith moves from normal position admitting fluid from said inlet port into said associated chamber to effect the selected movement of said control member.

2. The valve of claim 1 wherein said solenoid and said pilot valve spool are of unitary construction to facilitate insertion and removal thereof from operative position in said associated recess.

3. An hydraulic valve having a valve body provided with an inlet port, means for establishing a back pressure in said inlet port, a tank port and a pair of cylinder ports, a main valve spool slidably mounted in said valve body for selectively admitting hydraulic fluid into one of said cylinder ports from said inlet port and from the other of said cylinder ports to said tank port, a pair of pilot valves for effecting movement of said main valve spool to control the flow of hydraulic fluid into their associated cylinder port, first channel means communicating said inlet port with said main valve spool, second channel means connecting said tank port with said main valve spool, third and fourth channel means connecting said main valve spool and each of said cylinder ports, means normally positioning said main valve spool for interconnecting said first and second channel means for passage of hydraulic fluid from said inlet port directly to said tank port and means for selectively actuating one of said pilot valves for effecting movement of said main valve spool in a selected direction to connect said first channel means with said third or fourth channel means for passage of hydraulic fluid from said inlet port to the cylinder port associated with said actuated pilot valve, said pilot valves being mounted with their respective valve spools disposed in an associated recess in said valve body, passage means communicating each of said recesses with said inlet port, a solenoid for operating each of said pilot valves, means normally positioning said pilot valve spools for interrupting the flow of hydraulic fluid from said inlet port through said recess, a chamber formed in said valve body adjacent each end of said main valve spool, means communicating one of said chambers with one of said recesses, and means connecting said solenoid to the valve spool of its associated pilot valve whereby, upon selected energization of one of said solenoid, the pilot valve spool associated therewith moves from normal position admitting fluid from said passage into the chamber associated with said energized solenoid for effecting sliding movement of said main valve spool in the desired direction.

4. The valve of claim 3 wherein said solenoid and associated pilot valve spool are interconnected to form a single operative unit to facilitate insertion and removal thereof from operative position in their associated recess.

5. The valve of claim 3 wherein said tank port includes a check valve for developing back pressure, second passage means connecting said tank port to each of said recesses, said pilot valve spools being operative to normally admit back pressure fluid from said second passage means into their associated chambers, said back pressure fluid in said chambers ensuring positive smooth main spool movement upon actuation of one of said solenoids.

6. A bank of hydraulic valve assemblies, each assembly having a valve body provided with an inlet port, a tank port and a pair of cylinder ports, a main valve spool slidably mounted in said valve body for selectively admitting hydraulic fluid into one of said cylinder ports from said inlet port and from the other of said cylinder ports to said tank port, a pair of pilot valves for effecting movement of said main valve spool to control the flow of hydraulic fluid into their associated cylinder port, first channel means communicating said inlet port with said main valve spool, second channel means connecting said tank port with said main valve spool, third and fourth channel means connecting said main valve spool and each of said cylinder ports, means normally positioning said main valve spool for interconnecting said first and second channel means for passage of hydraulic fluid from said inlet port directly to said tank port and means for selectively actuating one of said pilot valves for effecting movement of said main valve spool in a selected direction to connect said first channel means with said third or fourth channel means for passage of hydraulic fluid from said inlet port to the cylinder port associated with said actuated pilot valve, a plurality of said valve assemblies being interconnected with the tank port of the first of said valve assemblies in the direction of fluid flow being connected to the inlet port of its contiguous valve assembly and the last of said interconnected valve assemblies being provided with a check valve in its tank port to provide back pressure fluid for each pair of pilot valves in the entire bank of valve assemblies.

References Cited by the Examiner
UNITED STATES PATENTS

| | | | |
|---|---|---|---|
| 2,716,425 | 8/1955 | Yarber | 251—14 X |
| 2,853,976 | 9/1958 | Gerwig et al. | 137—625.64 |
| 3,106,938 | 10/1963 | Gordon | 137—625.68 |
| 3,177,599 | 4/1965 | Rood | 137—625.66 X |
| 3,191,626 | 6/1965 | Leibfritz | 137—625.69 |

M. CARY NELSON, *Primary Examiner.*

MARTIN P. SCHWADRON, *Examiner.*

S. SCOTT, *Assistant Examiner.*